US005854789A

United States Patent [19]

Lesch et al.

[11] Patent Number: 5,854,789
[45] Date of Patent: Dec. 29, 1998

[54] ATM COMMUNICATION SYSTEM WITH A MODULAR STRUCTURE AND COMMUNICATION MODULES

[75] Inventors: Hilmar Lesch, Wolfratshausen; Klaus Kirchberger, München; Werner Stöckl, Baierbrunn; Horst Rombach, München, all of Germany

[73] Assignee: Siemens Aktiengesellschaft, Munich, Germany

[21] Appl. No.: 704,645

[22] PCT Filed: Mar. 13, 1995

[86] PCT No.: PCT/DE95/00342

§ 371 Date: Sep. 13, 1996

§ 102(e) Date: Sep. 13, 1996

[87] PCT Pub. No.: WO95/25411

PCT Pub. Date: Sep. 21, 1995

[30] Foreign Application Priority Data

Mar. 16, 1994 [DE] Germany .......................... 44 08 974.0

[51] Int. Cl.[6] .............................. H04L 12/28; H04L 12/56
[52] U.S. Cl. ............................................. 370/395; 370/410
[58] Field of Search ..................................... 370/252, 242, 370/395, 388, 389, 396–400, 410

[56] References Cited

U.S. PATENT DOCUMENTS

| 4,907,220 | 3/1990 | Rau et al. . | |
| 5,506,842 | 4/1996 | Beck et al. | 370/395 |
| 5,515,377 | 5/1996 | Horne et al. | 370/395 |
| 5,546,386 | 8/1996 | Gass | 370/395 |
| 5,596,572 | 1/1997 | Wille-Fier et al. | 370/395 |

OTHER PUBLICATIONS

International Conference on communications ICC (1994), Design and Implementation of a Distributed Call Processing Architecture, by T.F. La Porta et al, pp. 278–282.
AT&T Technical Journal, vol. 72, Nov./Dec. (1993), Technologies for Broadband Switching, by Pashan et al, pp. 39–47.
Siemens publication (1992), ATM Technologie für zukünftige Breitbandnetze, (ATM Technology for Future Broadband Networks), pp. 1–22.

Primary Examiner—Ajit Patel
Attorney, Agent, or Firm—Hill & Simpson

[57] ABSTRACT

An ATM communication system (KS) for the connection of ATM communication terminals (KE) is formed by a switching device (SB) and a control device (CB). In the switching device (SB), a transport program module (TSP), and also a dependability subprogram structure (DEP-SB), an operation subprogram structure (CP-SB) and a switching subprogram structure (AM-SB) and a message distribution program module (MD) are provided in a multi-tasking operating system (OSS). The control device (CB) has a multi-tasking operating system (OSC) with a transport program module (TSP), a process management program module (PVP), and also a switching program structure (CP), a dependability program structure (DEP), an operation program structure (AM) and a communication program structure (KMP). This software design achieves the effect of making the procedural program structure largely independent of the program structure related to the communication terminal connections in the switching device (SB) and of considerably reducing the scale of the central program structures in the control device (CB). In addition, this program design has the effect of considerably reducing the message flow between the control device (CB) and the switching device (SB).

5 Claims, 6 Drawing Sheets

ATM COMMUNICATION SYSTEM WITH A MODULAR STRUCTURE AND COMMUNICATION MODULES

BACKGROUND OF THE INVENTION

ATM communication systems with a modular structure serve for the connection of communication terminals with high transmission rates in private and public communication networks. The transmission and switching of the messages takes place according to the Asynchronous Transfer Mode (ATM), in which the information items to be transmitted are transmitted and switched in packet form, i.e. with packets of fixed length (cells) in accordance with CCITT Standard I.361. Internationally standardized transport bit rates are currently 155 and 622 Mbit/s. With the aid of channel and path information inserted in the cell headers of the cells, the cells are transmitted over a virtual transmission channel from one communication terminal via at least one communication system to a particular communication terminal. The transmission channel is set up by signalling from a subscriber—as in the known time-division multiplex communication systems—or by an administrative input at the communication system and is logically retained for the duration of the connection. The bandwidth of such a transmission channel is flexible and is applied for when the connection is established. Such basic functions of ATM communication systems are known from the publication "ATM Technologie für zukünftige Breitbandnetze" [ATM Technology for Future Broadband Networks], Siemens, 1992.

The publication ICC '94, "Design and Implementation of a Distributed Call Processing Architecture" already discloses an ATM communication network structure in which the ATM communication terminals are connected on the one hand to an ATM communication system, effecting the through-connection, and on the other hand via a local area network to a server, realizing the call control, and to a server, realizing the connection control. In the ATM communication terminals, in the call-control server and connection-control server and in the ATM communication system there is provided in each case a program with the known standardized ATM functions. In the case of this ATM communication network structure, the ATM connection control and ATM information transmission are handled via different communication networks.

For the realization of, in particular, relatively small ATM communication systems, a separation of the communication system into a switching device, effecting the switching of the connected ATM communication terminals, and a control device, effecting the connection control of the ATM communication terminals and also administering and monitoring the communication system, has been proposed, it being possible for the control device to be realized by a personal computer. The exchange of messages between the switching device and the control device is controlled with the aid of a communication module integrated in the switching device and a communication adapter inserted in the control device.

SUMMARY OF THE INVENTION

To be regarded as the object on which the invention is based is that of designing a modular program structure for a communication system with such a modular structure.

In general terms the present invention is an ATM communication system with a modular structure for the connection of ATM communication terminals. The system has a switching device with at least one multi-tasking operating system. In the switching device a transport program module, realizing a message transport interface between the operating system and a message distribution program module, is managed. A dependability subprogram structure monitors the components of the switching device and configures them in the event of an error. An operation subprogram structure controls the virtual connections for the message traffic in the switching device. A switching control subprogram structure controls switching aspects of the connections with a control device and adapts the switching messages to the physical design of the switching device. Messages within the program structures of the switching device and to and from the control device are controlled by the message distribution program module. The system also has a control device with a multi-tasking operating system. In the control device a transport program module, realizing a message transport interface between the operating system and a process management program module, is managed. A switching program structure effects switching control of the switching device. A dependability program structure monitors the components of the control device and configures them in the event of an error. An operation program structure administers the switching device and control device. A communication program structure realizes a switching ATM communication network access. The system further has a communication adaptor, realizing the connection between the control device and the switching device. The adaptor has a multi-tasking operating system. A system control program structure monitors the communication adaptor. A message transfer program structure controls and monitors the message transfer in the Asynchronous Transfer Mode.

Advantageous developments of the present invention are as follows.

In the communication module there is additionally provided a connection management program module, setting up and managing the virtual connections intended for the operation, switching and dependability message traffic. A message distribution program module distributes messages to the program modules. A data transmission program module realizes the safeguarding of a connection.

In the control device there can additionally be implemented a data server program module, managing the persistent object data on at least one fixed storage unit. A resource program module manages the resources of the control device. Utility program modules provides functions for development, integration, tests and maintenance.

In the communication adaptor the system control program structure is formed by the following elements. A system control program module administers and monitors the communication adaptor. A watchdog program module monitors the watchdog. A test program module is equipped with detecting, displaying and switching functions in the sense of testing the communication adaptor. The message transfer program structure is formed by the following elements. A data transfer program module controls switching aspects of the message. A data transmission program module realizes the safeguarding of a connection. A line program module controls the physical transmission technology.

In the control device the switching program structure is formed by the following elements. A switching subprogram module realizes the switching function for the connection of connected communication devices. A monitor program module realizes the interface with respect to the dependability and operation program structure. A signalling subprogram module realizes an ATM subscriber signalling protocol of the control device. A logical switching subprogram module effects the logical switching of two ATM communication terminals. Further program modules are provided for the management of switching data and resources and also for the handling of error messages. In the switching device the switching subprogram structure is formed by the following elements. A physical switching subprogram module effects the physical through-connection between two ATM communication terminals. A further signalling subprogram module safeguards the message traffic. A hardware program module represents the link with the circuit technology.

To be regarded as the essential aspect of the program structure according to the invention is that the separation of the switching, operation and dependability software into central switching, operation and dependability program structures and decentralized switching, operation and dependability subprogram structures achieves the effect of largely isolating the procedure-related program modules from the hardware-related program modules. As a result, the switching, operation and dependability procedures can be realized in a higher, abstract level in the control device. This means on the one hand a considerable reduction in the scale of the central switching, operation and dependability program structures and on the other hand that this program structure is largely independent of the physical realization in the switching device. In addition, this program design has the effect of considerably reducing the message flow between the control device and the switching device.

Furthermore, the implementing of a transport program module and a message distribution program module in the switching device and of a transport program module and also a process management program module in the control device has the effect of increasing the program modularity, i.e. the adding and removing of program modules is facilitated, required modifications in implemented program modules remaining small.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
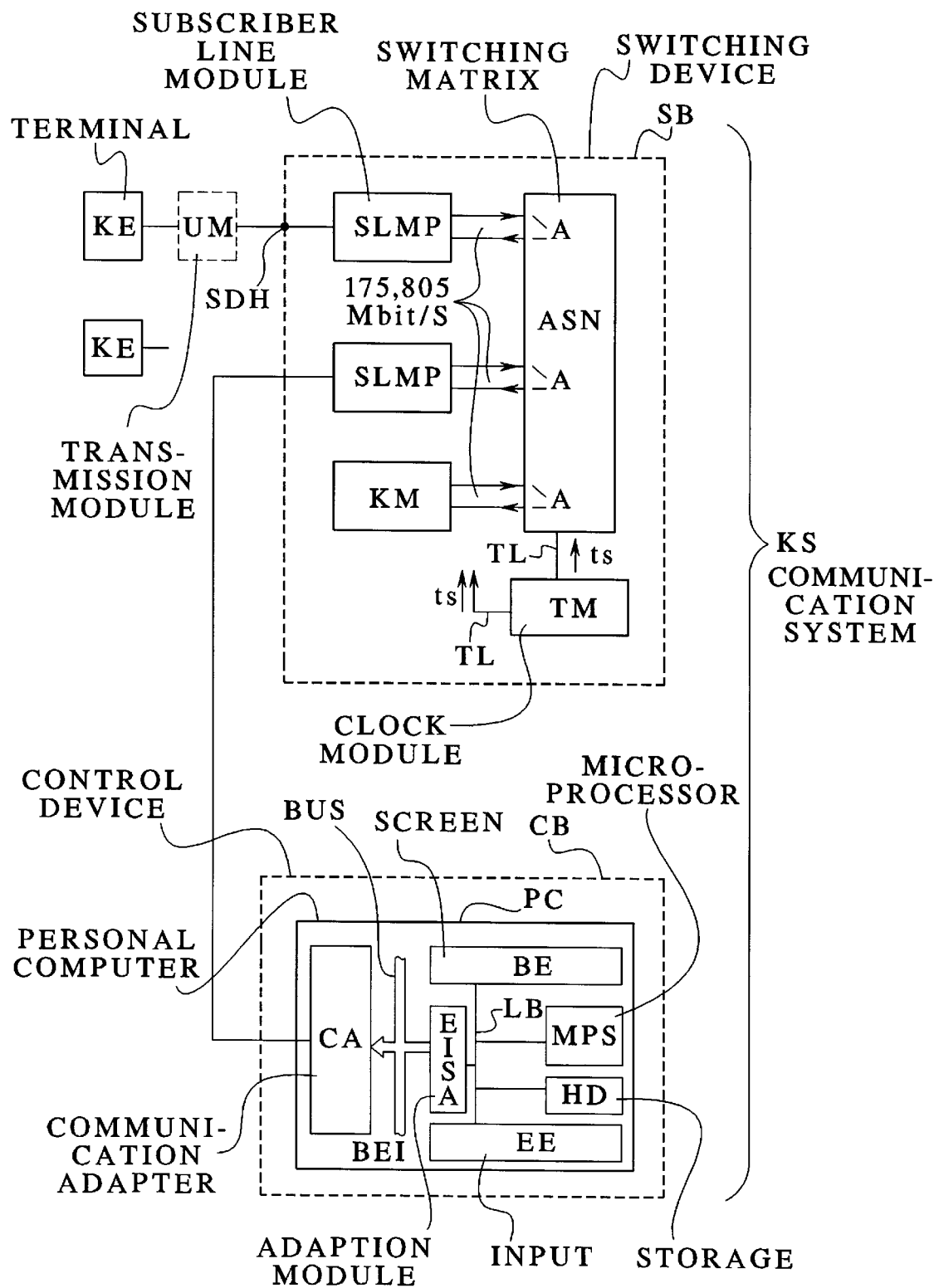
FIG. 1 shows the hardware structure of an ATM communication system on which the program structure according to the invention is based.

FIG. 1 shows a communication system KS, which is formed by a switching device SB and by a control device CB.

Arranged in the switching device SB is an ATM switching matrix module ASN, operating by the Asynchronous Transfer Mode, a plurality of subscriber line modules SLMP, a communication module KM and a clock module TM.

The ATM switching matrix module ASN is designed, for example, with sixteen bidirectional terminal connections A with a transmission rate of 175.805 Mbit/s each. For the switching of cells formed on the basis of the Asynchronous Transfer mode, they are switched in accordance with the accompanying switching information via the ATM switching matrix module ASN according to the self-switching principle. This means that, with the aid of the accompanying switching information—for example in a preceding, additional cell header—a cell is switched independently via the switching matrix module ASN. The information items are physically transmitted by differential shifted ECL (Emitter Coupled Logic) signals, NRZ (Non Return to Zero)-coded, to each of the sixteen terminal connections A of the processor-controlled ATM switching matrix module ASN. The ATM switching matrix module ASN is realized, for example, according to the switching matrix disclosed in European Reference EP 0 329 005 B1.

A subscriber line module SLMP or a communication module KM can be connected to each of the sixteen terminal connections A, a communication module KM being provided in a switching device SB. In FIG. 1, two subscriber line modules SLMP are represented by way of example of a maximum of 15 connectable subscriber line modules.

In the clock module TM, clock signals ts required for the operation of the ATM switching matrix module ASN, of the subscriber line modules SLMP and of the communication module KM are formed and are transmitted over separate clock lines TL to the respective components of the switching device SB. These clock signals ts are intended in particular for the operation of the microprocessors used in the components SLMP, ASN, KM of the switching device and for the transmission of the information via the interfaces in accordance with the switching device.

For the connection of communication terminals KE operating by the Asynchronous Transfer Mode, the subscriber line modules SLMP are equipped with an SDH (Synchronous Digital Hierarchy) interface SDH with a transmission rate of 155 mbit/s. The data or information transmission via the SDH interface SDH is carried out in accordance with CCITT recommendation I.121 (User Network Interface UNI) in the Synchronous Transfer Mode (STM-1) at a transmission rate of 155.52 mbit/s.

Indicated by a rectangle represented in dashed lines and inserted between the communication terminal KE and the subscriber line module SLMP are transmission modules UM, with the aid of which remote communication terminals KE are connected to the switching device SB. The transmission modules UM contain transmission devices—not shown—for an electrical transmission of the cell-oriented information over coaxial cables in accordance with CCITT recommendation G.703 or for an optical transmission over optical waveguides in accordance with CCITT recommendation G.957/958.

Such broadband communication terminals KE for the connection to the switching device SB can be realized by a multiplicity of devices. Mentioned by way of example are terminal connections to further ATM communication systems KS, adaptors for the connection of local area networks, ISDN switching devices—for example to the HICOM switching system—and ATM workstations.

With the aid of the communication module KM, the cells to be transmitted from the control device CB or to it are controlled. For this purpose, a layer 2 function, corresponding to the ISO layer model, and a layer 3 function, intended for the switching of the cells within the switching device SB, are realized in the communication module KM. Furthermore, the communication module KM comprises a switching subfunction, with the aid of which switching, administrative and operation messages transmitted from the control device CB and in the reverse direction are transformed into messages conforming to the switching device, i.e. in relation to the physical design of the switching device SB.

For the communication of the switching device SB with the control device CB, the latter is equipped with a communication adaptor CA. The communication adaptor CA is arranged in a personal computer PC, realizing the control device CB.

In the known way, the personal computer PC, realized by a commercially available personal computer, has a screen device BE, an input device EE, mass storage devices HD—for example hard disks—and a microprocessor system MPS. In addition, an adaption module EISA, realizing an EISA bus BEI, is integrated in the personal computer PC, the communication adaptor CA being connected to the EISA bus BEI. The components BE, EE, MPS, HD, EISA of the personal computer PC communicate via an internal local bus LB. The EISA bus is a bus which is isolated from the internal, local bus LB and has a bit width of 32 bits and a transfer rate of 33 mbyte/s.

Figure 2:
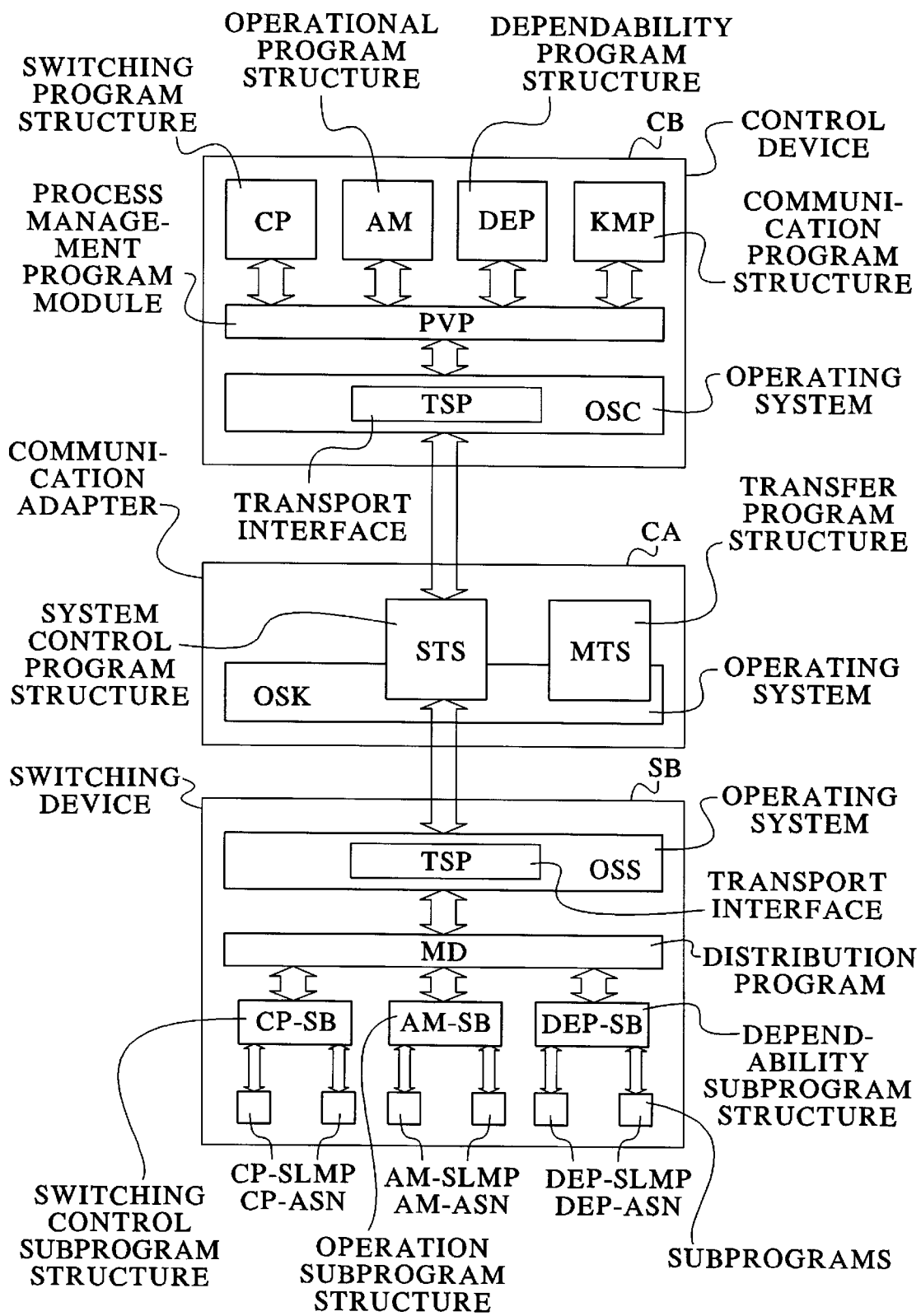
FIG. 2 shows the program structure for an ATM communication system according to FIG. 1.

FIG. 2 shows the program structure of an ATM communication system with a modular structure according to FIG. 1. In the control device CB, the link to the hardware represents a multi-tasking operating system OSC, in which a transport program module TSP, carrying out the message transport to the hardware and to devices of the control device, and hardware device drivers are realized.

In a process management program module PVP, the communication between the program structures and the operating system OSC is controlled. Provided for this purpose there is for the switching control of the switching device SB a switching program structure CP, a dependability program structure DEP, monitoring the components of the control device CB and of the switching device SB and configuring them in the event of a malfunction, and an operation program structure AM, administering the switching device SB and control device CB, and also a communication program structure KMP, realizing the switching ATM communication network access.

The processor-controlled communication adaptor CA has a system control program structure STS, monitoring the communication adaptor CA, and a message transfer program structure MTS, controlling and monitoring the message traffic in Asynchronous Transfer Mode, the two program structures STS, MTS communicating with the hardware of the communication adaptor CA via an operating system OSK.

In the switching device SB, a further operating system OSS represents the link between the hardware components and the application program modules. Provided in this operating system OSS is a transport program module TSP, with the aid of which a message transport interface between the operating system and a message distribution program module MD is realized. With the aid of the message distribution program module MD, the messages are controlled within the switching device SB between the subprogram structures. Provided in the switching device SB is a switching control subprogram structure CP-SB, controlling switching aspects of the connections with the control device CB and adapting the switching messages to the physical design of the switching device SB. This switching control subprogram structure CP-SB is essentially realized in the communication module KM. It is indicated by the further program modules CP-SLMP and CP-ASN represented in FIG. 2 that smaller subprograms in relation to the switching control subprogram structure CP-SB are realized in the subscriber line module SLMP and in the ATM switching matrix module ASN. Furthermore, implemented in the switching device is a dependability subprogram structure DEP-SB, monitoring the components of the switching device SB and configuring them in the event of a malfunction, subprograms AM-SLMP, AM-ASN being provided in the subscriber line module SLMP and in the ATM switching matrix module ASM in analogy with the switching control subprogram structure CP-SB. The switching device SB has, furthermore, a connection subprogram structure AM-SB, controlling the virtual connections for the message traffic in the switching device SB, this structure likewise being assigned subprograms AM-SLMP, AM-ASN, realized in the subscriber line module SLMP and in the ATM switching matrix module ASN.

Figure 3:
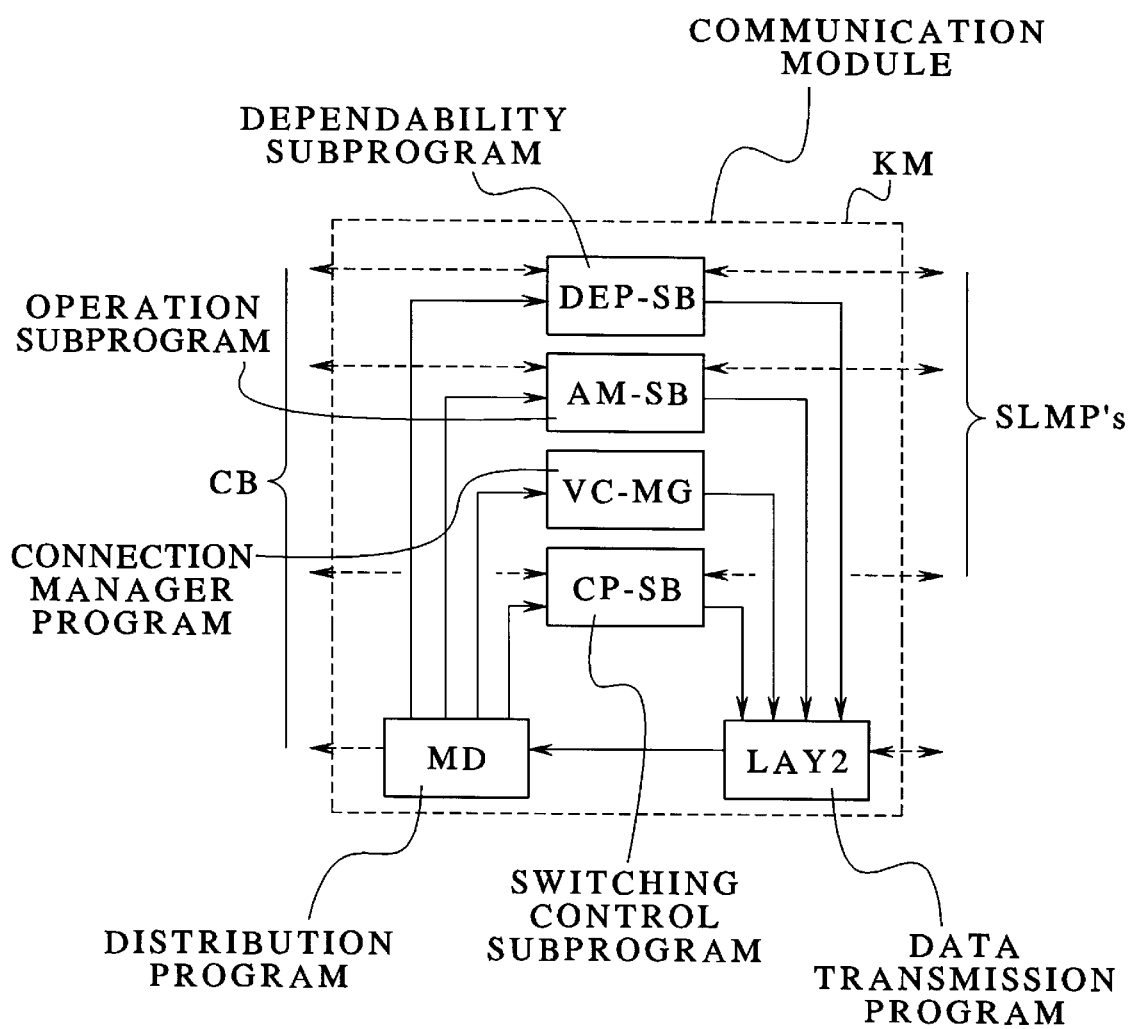
FIG. 3 shows the program structure in the communication module of the switching device according to FIG. 1.

FIG. 3 shows the program structure in the communication module KM, in which the essential program modules of the switching device SB are realized. As already indicated in FIG. 1, the essential program modules are a dependability subprogram module DEP-SB, an operation subprogram module AM-SB, a switching subprogram module CP-SB and a message distribution program module MD. Also represented in FIG. 3 are a data transmission program module LAY2 and a connection manager program module VC-MG. The indicated software architecture is based on a process concept. In this case, the previously specified program modules DEP-SB, AM-SB, VC-MG, CP-SB, MD, LAY2 are realized by individual processes. All the functions for this process control, for a resources management and also for a communication between the processes are provided by the operating system OSS represented in FIG. 1. The operating system OSS is advantageously realized by the operating system COSMOS in the version for microprocessors SAB 80386 of the Siemens company.

With the aid of the message distribution program module MD, messages received are sent to the respectively responsible process. This involves, as part of the signalling by the subscriber, the virtual channel and path information of the corresponding virtual connection being assessed and the message being sent in accordance with the assessment to a reception process. In further cases, the assessment of the information in the message is required in order to transmit a message or information to a process. The message distribution program module MD makes available in the control device CB the transport service TSP, realized in the operating system OSS.

The connection manager program module VC-MG comprises all the functions which are required for the management of the virtual connection as part of an ATM connection. These are essentially functions for the allocation of the virtual paths—and path information and also settings of the circuit components realizing an ATM connection. For the message traffic within the switching device SB, dedicated virtual connections to the respective components are permanently set up during commissioning.

With the aid of the data transmission program module LAY2, the layer 2 functions of all the connections routed via the communication module KM are managed, irrespective of the purpose for which the connection is intended—for example signalling by the subscriber or control of the ATM switching matrix module.

The switching subprogram module CP-SB, or the switching process, has no switching functions with respect to the assessment or handling of layer 3 messages. These messages are relayed transparently to the addressed components of the ATM communication system. Furthermore, the switching process CP-SB comprises a physical switching system PSS, with the aid of which, and the aid of the further components of the switching device SB, subscriber connections can be physically set up or disconnected. This involves having to coordinate and monitor the subprograms CP-SLMP, CP-ASM, implemented in the further components of the switching device SB. For the exchange of switching information with the aid of switching messages, a switching interface is realized in the switching process CP-SB and the subprograms. This is a message interface, i.e. the exchange of information between the components of the communication system takes place by transmission of corresponding messages.

The operation subprogram module AM-SB represents a subprogram of the operation program structure AM in the control device CB. For the communication exchange, an operation interface with a defined message format is used. By transmitting operation messages, subscriber lines are set up, modified and managed in the switching device SB.

The dependability subprogram module DEP-SB, or the dependability process, realizes together with the dependability program structure DEP in the control device CB the dependability functions in the ATM communication system. The dependability process DEP-SB serves as a communication partner for the dependability program structure DEP in the control device CB. The dependability process DEP-SB independently monitors all the components of the switching device CB, except any error messages from these modules and relays them to the dependability program structure DEP of the control device CB. Furthermore, status enquiries initiated by the control device CB are answered and, if an answer is not given, the switching device CB may be reset to a defined initial status by a corresponding message.

Figure 4:
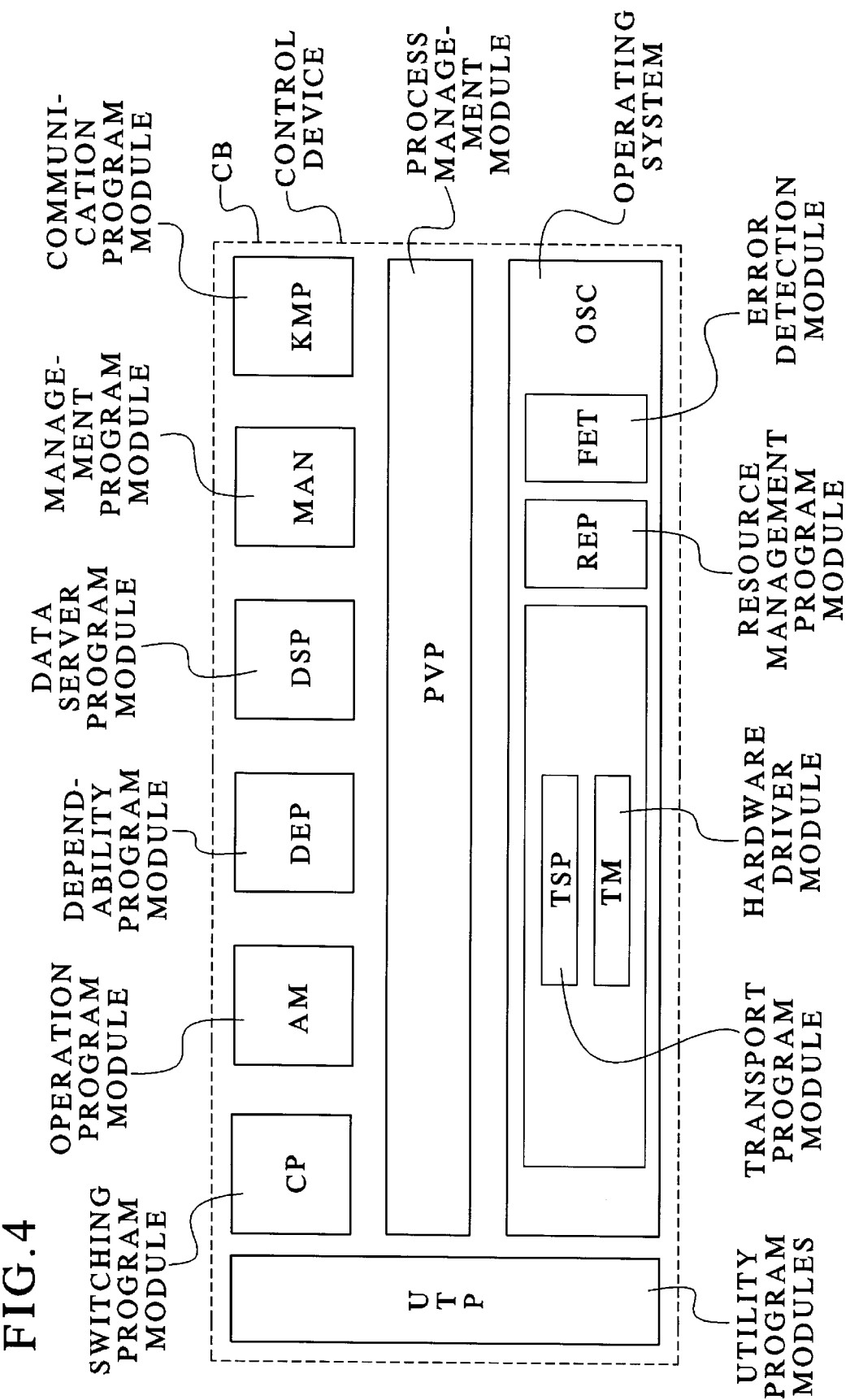
FIG. 4 shows the program structure in a control device according to FIG. 1.

FIG. 4 shows the software structure of the control device CB. A switching program module CP realizes the essential switching functions in the ATM communication system. With the aid of a dependability program module DEP, the system integrity and the hardware functionalities are monitored. Furthermore, a central error handling is carried out for the hardware and the software. In addition, a database representing the hardware status of the ATM communication system is managed.

With the aid of a data server program module DSP, persistent object data stored on fixed storage devices, predominantly configuration data, are managed. Furthermore, an interface for data access is made available.

With the aid of an operation program module AM, the access to components to be administered of the ATM communication system is realized, an administration interface for the communication exchange with the switching device SB with a predetermined message format being made available for this.

In a communication program module KMP, functions for the access of the control device to the ATM communication network are realized. These are essentially functions which handle a signalling by the ATM subscriber to the ATM communication network. The communication program module KMP can be realized in such a way that the control device CB can be used both as an ATM communication terminal KE of an ATM communication network and as a control device CB of an ATM communication system KE.

A management program module MAN realizes the management functions for the ATM communication system KS and makes a user interface available for this.

A process management program module PVP represents the link between the individual processes, or program modules, and the operating system. Together with a transport program module TSP in the operating system OSC, the communication between the processes and to the switching device SB is ensured. Furthermore, in the process management program module PVP, the individual processes are managed, i.e. loaded, ended, etc.

The operating system OSC is realized, for example, by a SORIX operating system of the Siemens company for workstations. In this operating system OSC, hardware driver modules TM are provided for the communication with circuit components. With the aid of a resources management program module REP, implemented in the operating system OSC, the system resources, such as for example memories and disk storage units etc., are managed. With the aid of an error detection module FET, system errors are detected and collected.

For the development, integration, testing and maintenance of the ATM communication system, utility program modules UTP—indicated by a rectangle—are provided in the control device CB.

Figure 5:
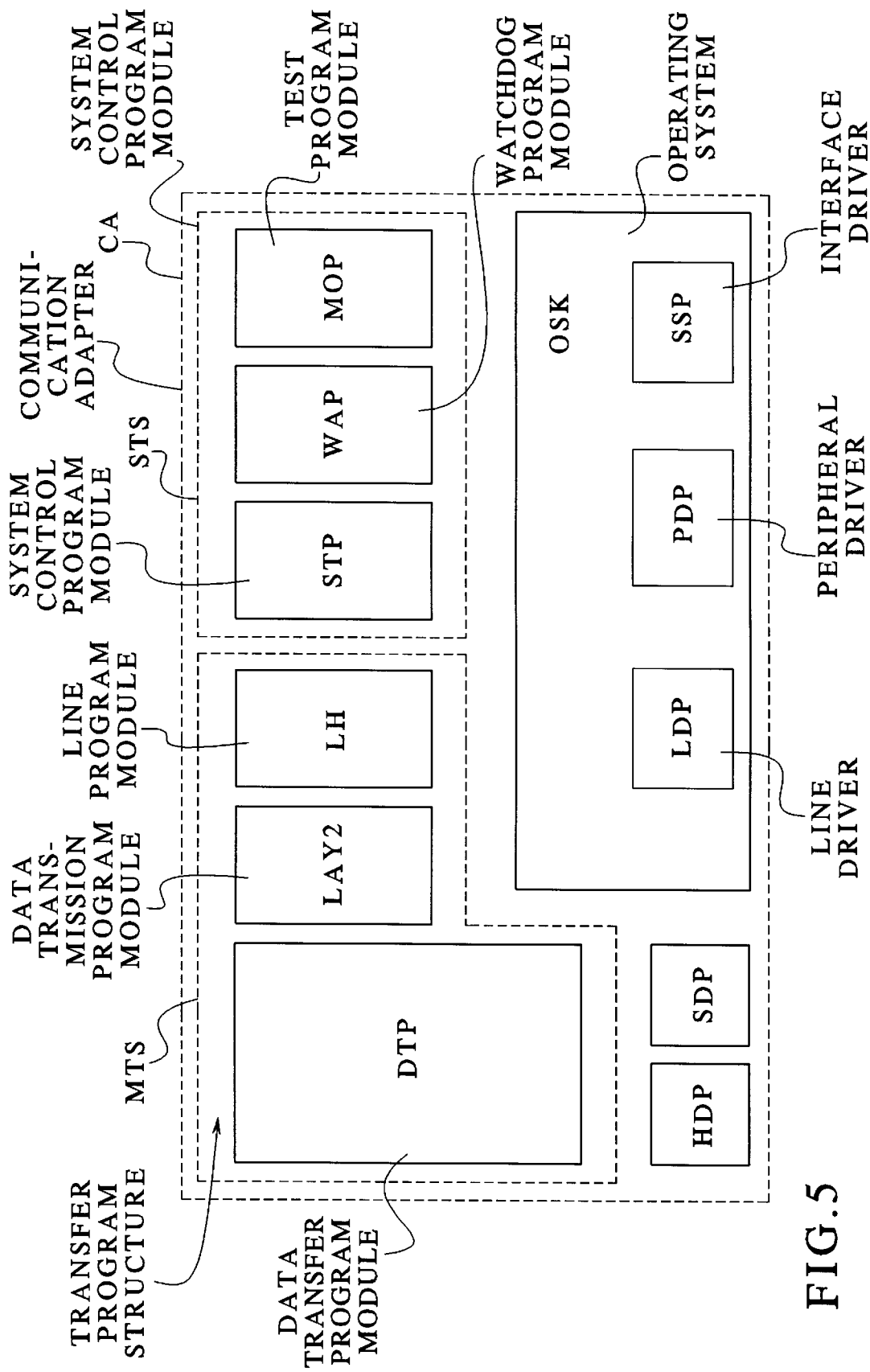
FIG. 5 shows the program structure in a communication adaptor according to FIG. 1.

FIG. 5 shows the software structure in the communication adaptor CA. Provided as operating system OSK is likewise the operating system COSMOS in the version for microprocessors SAB 80386 of the Siemens company.

The controlling of the communication flow via the communication adaptor CA is accomplished essentially with the aid of a data transfer program module DTP. This essentially involves setting the virtual channel and path information items, separating the received data streams into user data and control data and, if appropriate, reinserting them into cells, i.e. relaying them to the segmentation and desegmentation module. This data transfer program module DTP is supported by a data transmission program module LAY2, with the aid of which the link layer 2 of the layer-2 protocol standardized by ISO is controlled. With the aid of a line program module LH, the transmission technology realized in circuit form is commissioned and any malfunctions occurring are detected and analyzed and corresponding responses are initiated. These three program modules together form the message transfer program structure MTS.

A system control program structure SPS is formed by a system control program module STP, a watchdog program module WAP and by a test program module MOP. With the aid of the system control program module STP, the communication with dependability and operation subprogram modules is controlled, i.e. controlled by messages transmitted by the control device CB. Furthermore, with the aid of the system control program module STP, the configuration data of the communication adaptor CA are managed and the operating of the line program module LH is controlled. The watchdog program module WAP is responsible for the routine triggering of a watchdog. With the aid of a test program module MOP, instantaneous statuses of operating system modules and user program modules or processes can be detected and relayed. Furthermore, with the aid of the test program module MOP, contents of registers can be displayed and, with the aid of switching means, circuits can be set by clock signals.

In the operating system OSK, three driver program modules are represented in FIG. 5. These driver program modules represent the link to the respective hardware components. To be specific, these are a line driver LDP for operating and interrupt preprocessing for a transmission module, not shown, a peripheral driver PDP for operating hardware drivers, interrupt controllers, of the watchdog and an interface driver SSP for driving a V.24 hardware controller, realizing a V.24 interface.

Figure 6:
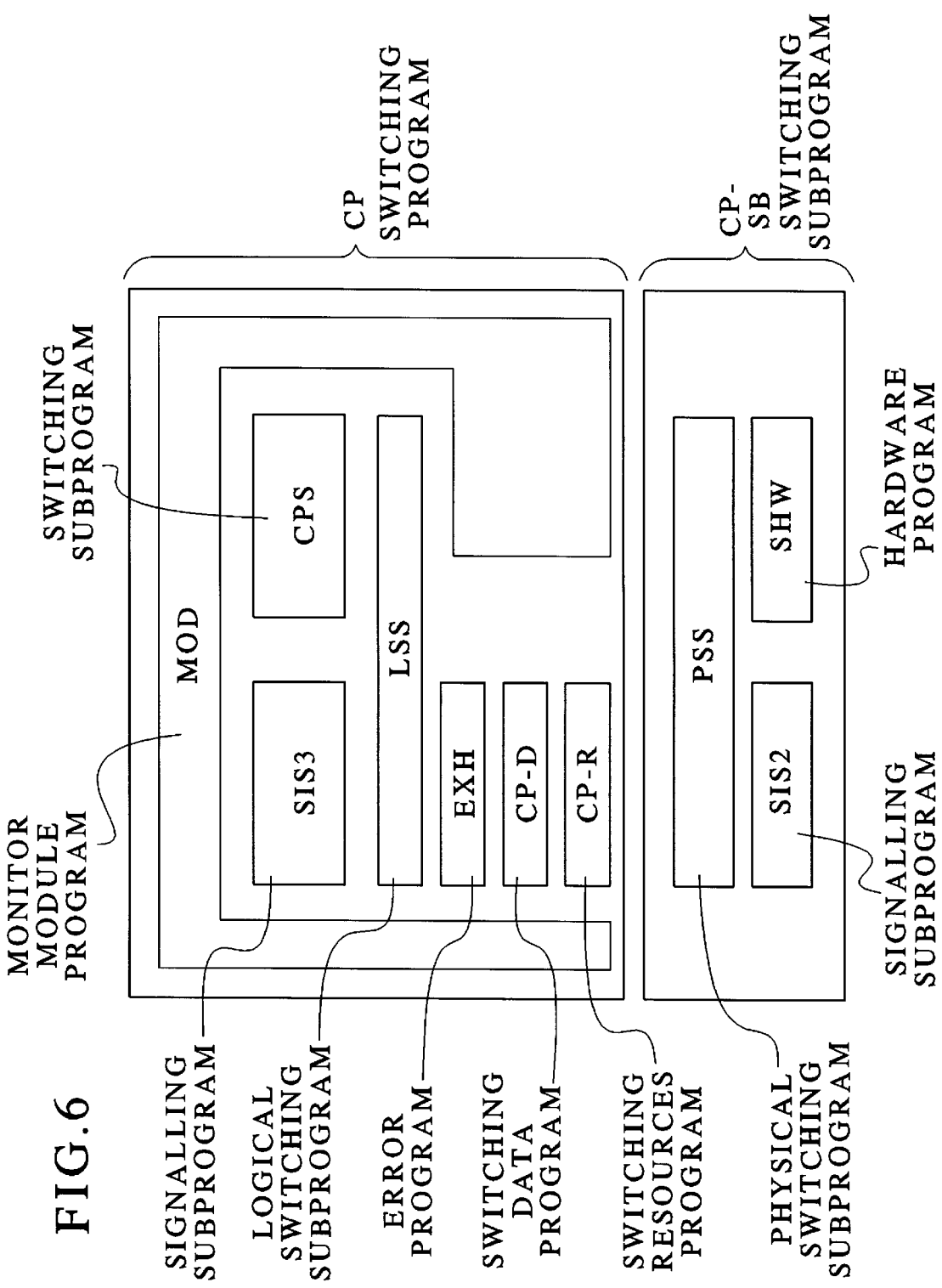
FIG. 6 shows a signaling sub-program module according to the present invention

FIG. 6 shows a structure of the switching program structure CP, realized in the communication system KS according to FIG. 2, and of the switching subprogram structure CP-SB. The switching program structure CP is stored in the program memory of the personal computer PC, representing the control device, and the switching subprogram structure CP-SB is stored essentially in the program memory of the communication module KM, arranged in the switching device SB.

The switching program structure CP is formed by a monitor program module MOD, a signalling subprogram module SIS3, a switching subprogram module CPS, a logical switching subprogram module LSS, a switching data program module CP-D, a switching resources program module CP-R and an error program module EXH. In the switching subprogram structure CP-SB, a physical switching subprogram module PSS, a further signalling subprogram module SIS2 and a hardware program module SHW are provided.

With the aid of the monitor program module MOD, the external software interfaces of the switching program structure CP are realized to form, for example, operation and dependability program structures according to FIG. 2. These are message-oriented interfaces, i.e. an exchange of information or data is handled exclusively by means of messages with a defined message format.

Contained in the signalling subprogram module SIS3 is a transport control function and a layer 3 function. This involves the layer 2 connections—in the ISO 7-layer model layer 2 represents the connection-oriented link layer (for example by HDLC connections)—being controlled by the transport control function.
The following tasks are assigned to the transport control function:
Processing of alerting signals for establishing and clearing down layer 2 connections which are required for the transport of layer 3 messages, i.e. switching messages.
Multiplexing of a plurality of switching connections in a layer 2 connection and their management.
Transfer of the information from the link layer (layer 2) to the network layer (layer 3) and vice versa.
Processing of error messages within the link layer.

The layer 3 function represents the switching layer, there being implemented in this layer a protocol program module which realizes an ATM signalling protocol in accordance with the standard "UNI Specification Draft 2.3" of the ATM forum of 1993.

This protocol program module represents the interface between the switching program modules and the link layer, the information to be transmitted and the status control being processed in accordance with the ATM signalling protocol. The signalling program module can be realized in two protocol variants. In the case of one protocol variant, the control device CB can be used as a control device CB of the communication system KS and, in the case of the other protocol variant, it can be used as a communication terminal.

In the switching subprogram module CPS, for each component of the ATM communication system KS involved in a connection there is a corresponding map available. The components are the user, the equipment and an access segment.

The user, or else subscriber, controls with his information transmitted within a signalling procedure the establishing and clearing down of connections and also the requesting of features. His signalling or dialling number and his entitlements to services, features, etc. represent the user, and these parameters are mapped in the switching subprogram module CPS in a user segment for the duration of a connection, i.e. are read from a segment of a database and are stored in the user segment.

The equipment is represented by that device via which a user is communicating with the communication system KS. Such a device may be represented by a communication terminal, a transfer device to other networks, for example to local area networks, or some other communication system, for example a further ATM communication system or an ISDN communication system. The parameters required for the description are mapped in an equipment segment for the duration of a connection.

An identification and a switching capability—in particular with regard to the signalling procedures at the communication terminal connection SDH—and the physical resources of communication terminal connections SDH assigned to this switching capability are entered by operation messages into an access segment and are managed.

The switching capabilities in an access segment are defined by entering a signalling information item, indicating the capability of signalling by a communication device, a type of signalling information item, indicating the type of signalling, and a path information item, indicating an assignment of virtual paths.

When a connection is established, the physical resources specified by the request transmitted by the connected communication device KE—for example transfer rate and number of channels—are taken from the corresponding access segments in accordance with the switching information transmitted by the switching device—for example source and destination address or the port or channel number—and are assigned for the duration of a communication relationship or a connection—a dedicated connection or dialed-up connection—to a logical terminal-connection subsegment and are provided for the switching processing. The logical terminal-connection subsegments are combined into connection segments LINK. A connection segment LINK, including an identifier ID, consequently represents the totality of the physical resources or properties related to the communication terminal connections of a communication device involved in a connection.

In the switching subprogram module CPS, connections between communication devices connected to the communication terminal connections are established and cleared down, or controlled, with the aid of the connection segments. Since each connection segment in each case represents a direction of transmission as far as the through-connect point, four connection segments are involved for the through-connection or controlling of a bidirectional connection.

In the logical switching subprogram module LSS represented in FIG. 6, the physical properties of the ATM user information channels—not the signalling channels—are abstracted to form logical termination points in the connection segments formed by access segments or terminal-connection subsegments. With the connection segments managed by the logical switching subprogram module LSS, the switching subprogram module CPS can realize the switching functions independently of the physical properties defined in the connection segments. The switching subprogram module LSS consequently serves for isolating the procedural switching function from the switching function executed by the circuit.

In the switching program structure CP, the data required for this are kept in persistent, static and dynamic objects with the aid of the switching data program modules CP-D. Data of the persistent objects are data which are stored in the communication system KS on the basis of operation messages and have to be preserved in all cases through to the time after a re-start. Data of the static objects represent data which are derived from the persistent data after a first-time start or re-start of the communication system KS. The dynamic data contain information on resources, statuses and linking information related to the connection program module.

In the error program module EXH, the error messages occurring in the switching program structure CP are collected and are transmitted via the monitor program module MOD to dependability program structures, not shown.

With the aid of the physical switching subprogram module PSS, implemented in the switching device SB, the switching messages transmitted by the control device CB are converted into hardware-approximate switching messages and are transmitted to the corresponding components of the switching device SB. This involves just informing the physical switching subprogram module PSS from the logical switching subprogram module LSS of, for example, which terminal connection of the ATM switching matrix module ASN is to be connected to which. Which physical path through the ATM switching matrix module ASN is chosen is managed by the physical switching subprogram module PSS—including the internal resources in the ATM switching matrix module. As a result, the procedural switching technology is used almost independently of the physical properties of the communication terminal connections and can therefore be used separately for extremely different physical characteristics of the communication system KS. Furthermore, this makes possible a largely hardware-independent development and maintenance of switching programs.

With the aid of the further signalling subprogram module SIS2—see FIG. 6—the messages to be transmitted to the components of the switching device SB or the control device CB are processed or controlled—in terms of switching, operation or dependability—with regard to layer1—the physical layer—and layer 2—the link layer.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An ATM communication system with a modular structure for connection of ATM communication terminals, comprising:
    a switching device with at least one first multi-tasking operating system;
    a control device with a second multi-tasking operating system, the control device having components;
    the switching system having components, and the switching device having and managing a transport program module, realizing a message transport interface between the operating system and a message distribution program module;
    the switching device having a dependability subprogram structure, monitoring the components of the switching device and configuring the components in the event of an error;
    the switching device having an operation subprogram structure, controlling virtual connections for message traffic in the switching device;
    the switching device having a switching control subprogram structure, controlling switching aspects of the connections with the control device and adapting switching messages to a physical switching system;
    messages within the program structures of the switching device and to and from the control device being controlled by the message distribution program module;
    the control device having a transport program module, realizing a message transport interface between the operating system and a process management program module;
    the control device having a switching program structure, effecting the switching control of the switching device;
    the control device having a dependability program structure, monitoring the components of the control device and configuring the components in the event of an error;
    the control device having an operation program structure, administering the switching device and control device;
    the control device having a communication program structure that effects access to a switching Asynchronous Transfer Mode (ATM) communication network;
    a communication adaptor, realizing the connection between the control device and the switching device and having a third multi-tasking operating system;
    the adaptor having a system control program structure, monitoring the communication adaptor; and
    the adaptor having a message transfer program structure, controlling and monitoring message transfer in Asynchronous Transfer Mode.

2. The communication system as claimed in claim 1, wherein the communication program structure forms a communication module and wherein in the communication module there is additionally provided;
    a connection management program module, setting up and managing the virtual connections intended for operation, switching and dependability message traffic;
    a message distribution program module, distributing messages to other program modules in the communications module; and
    a data transmission program module, realizing safeguarding of a connection.

3. The communication system as claimed in claim 1, wherein in the control device of the communication system there is additionally implemented;
    a data server program module, managing persistent object data on at least one fixed storage unit;
    a resources program module, managing resources of the control device of the communication system; and
    utility program modules, providing functions for development, integration, tests and maintenance.

4. The communication system as claimed in claim 1, wherein in the communication adaptor
    the system control program structure has
    a system control program module administering and monitoring the communication adaptor,
    a watchdog program module monitoring the watchdog,
    and a test program module equipped with detecting, displaying and switching functions for testing the communication adaptor, and wherein the message transfer program structure has a data transfer program module controlling switching aspects of the message, a data transmission program module realizing the safeguarding of a connection, and a line program module controlling a physical transmission device.

5. The communication system as claimed in claim 1, wherein in the control device the switching program structure has a switching subprogram module realizing a switching function for switching of connected ATM communication terminals, a monitor program module realizing an interface with respect to the dependability and operation program structure, a signaling subprogram module realizing an ATM subscriber signaling protocol of the control device, a logical switching subprogram module effecting logical switching of two ATM communication terminals, and further program modules for management of switching data and resources and also for handling of error messages, and wherein in the switching device the switching subprogram structure has a physical switching subprogram module effecting physical through-connection between two ATM communication terminals, a further signaling subprogram module safeguarding the message traffic, and a hardware program module representing a link with circuit hardware.

* * * * *